United States Patent
Yoshida et al.

(10) Patent No.: US 12,055,628 B2
(45) Date of Patent: Aug. 6, 2024

(54) POSITION COORDINATES ESTIMATION DEVICE, POSITION COORDINATES ESTIMATION METHOD, AND PROGRAM

(71) Applicant: NIPPON TELEGRAPH AND TELEPHONE CORPORATION, Tokyo (JP)

(72) Inventors: Manabu Yoshida, Musashino (JP); Yuki Yokohata, Musashino (JP); Kouhei Mori, Musashino (JP); Atsuhiko Maeda, Musashino (JP); Takahiro Hata, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 687 days.

(21) Appl. No.: 17/268,942

(22) PCT Filed: Aug. 7, 2019

(86) PCT No.: PCT/JP2019/031199
§ 371 (c)(1),
(2) Date: Feb. 16, 2021

(87) PCT Pub. No.: WO2020/039937
PCT Pub. Date: Feb. 27, 2020

(65) Prior Publication Data
US 2021/0341605 A1    Nov. 4, 2021

(30) Foreign Application Priority Data
Aug. 23, 2018  (JP) ................. 2018-156213

(51) Int. Cl.
*G01S 17/06* (2006.01)
*G01S 17/89* (2020.01)
(Continued)

(52) U.S. Cl.
CPC .............. *G01S 17/06* (2013.01); *G01S 17/89* (2013.01); *G06T 5/50* (2013.01); *G06T 7/70* (2017.01); *G06T 2207/20221* (2013.01)

(58) Field of Classification Search
CPC ..... G01C 21/3602; G01S 17/89; G01S 17/06; G01B 11/002; G06T 2207/10012;
(Continued)

(56) References Cited

U.S. PATENT DOCUMENTS

| 5,986,694 A | 11/1999 | Iino |
| 2003/0228034 A1 | 12/2003 | Fox et al. |

(Continued)

FOREIGN PATENT DOCUMENTS

| JP | H01312411 A | 12/1989 |
| JP | H1079027 A | 3/1998 |
| WO | WO-2017120595 A2 | 7/2017 |

OTHER PUBLICATIONS

"SIP Automated driving system for everyone a smile", May 11, 2018, Term 1, SIP Press Study Sessions (3rd Session), Internet<URL:http://www8.cao.go.jp/cstp/gaiyo/sip/press/jidosoko.pdf>.

(Continued)

*Primary Examiner* — Michael J Vanchy, Jr.
(74) *Attorney, Agent, or Firm* — Harness, Dickey & Pierce, P.L.C.

(57) ABSTRACT

A technique of estimating, based on a camera image captured from a mobile object, the position coordinates of an ambient object or the mobile object itself is offered. A plurality of camera images that are captured at different geographical locations and contain at least one identical stationary object are acquired; position coordinates of the imaging locations of the corresponding camera images are acquired; and the position coordinates of the stationary (Continued)

object are estimated based on the position coordinates of the imaging locations and gaze vectors oriented from a camera to the stationary object in each of the camera images. Alternatively, a camera image that contains at least two stationary objects having position coordinates that are known is acquired; and the position coordinates of a location at which the camera image is captured are estimated based on the position coordinates of each of the stationary objects and a gaze vector oriented from the camera to each of the stationary objects in the camera image.

6 Claims, 13 Drawing Sheets

(51) Int. Cl.
    *G06T 5/50*           (2006.01)
    *G06T 7/70*           (2017.01)

(58) Field of Classification Search
    CPC . G06T 2207/20221; G06T 5/50; G06T 7/593; G06T 7/70
    See application file for complete search history.

(56) References Cited

U.S. PATENT DOCUMENTS

| 2010/0004856 | A1  | 1/2010  | Kobori et al. |
| 2010/0310182 | A1* | 12/2010 | Kroepfl ................ G06V 10/462 |
|              |     |         | 707/E17.017 |
| 2018/0024562 | A1  | 1/2018  | Bellaiche |
| 2018/0114336 | A1  | 4/2018  | Chang et al. |
| 2018/0188026 | A1  | 7/2018  | Zhang et al. |
| 2021/0199437 | A1* | 7/2021  | Breed ...................... G06N 3/02 |

OTHER PUBLICATIONS

Redmon, J. et al., "UOLO9000: Better, Faster, Stronger", submitted Dec. 25, 2016, https://arxiv.org/abs/1612.08242.
International Search Report issued in PCT/JP2019/031199, mailed on Oct. 29, 2019.
Ignacio Parra et al: "Visual odometry and 3 map fusion for GPS navigation assistance", Industrial Electronics (ISIE), 2011 IEEE International Symposium on, IEEE, Jun. 27, 2011 (Jun. 27, 2011), pp. 832-837.

* cited by examiner

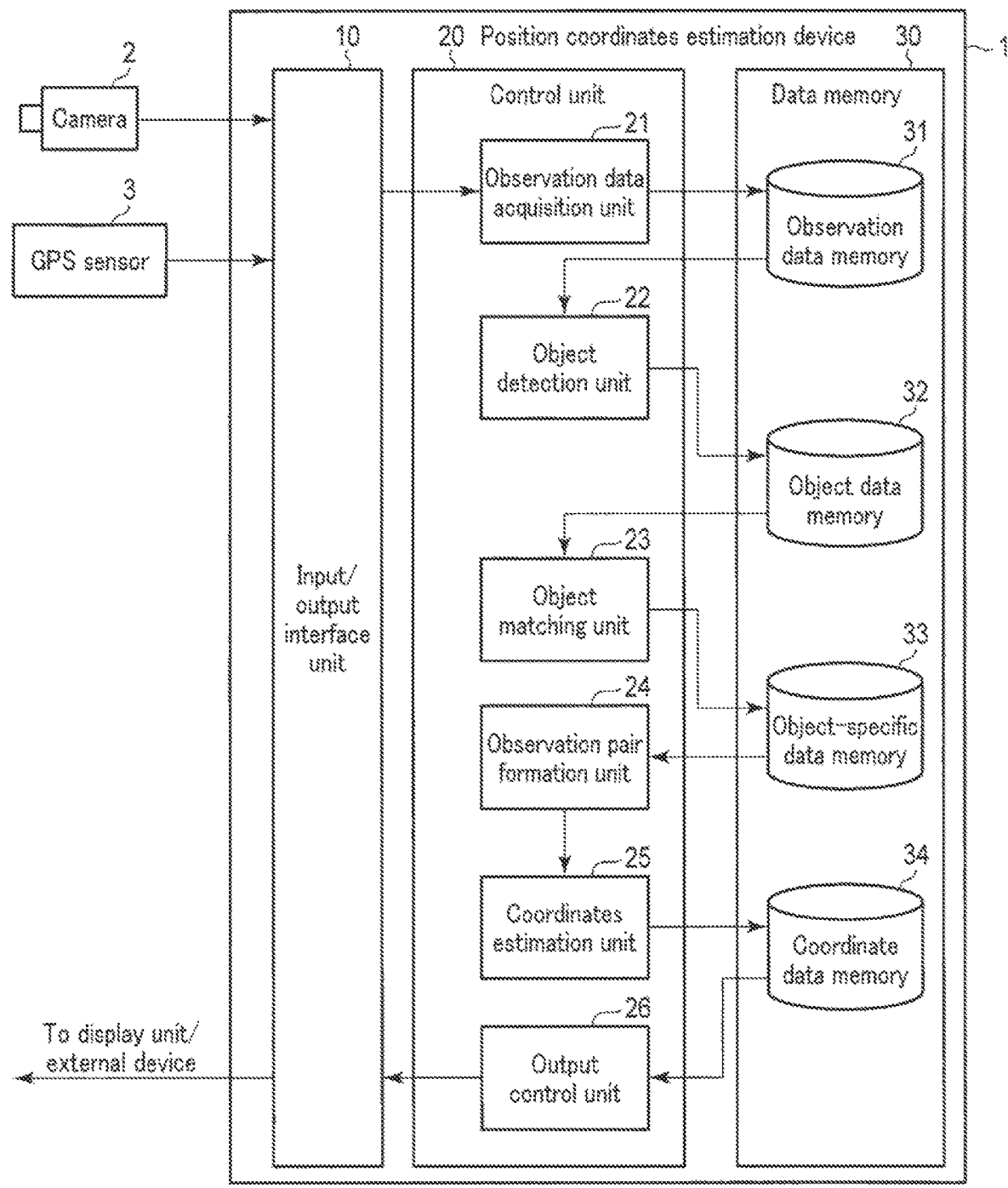
F I G. 3

| Time | Positional information | Degree of reliability of GPS measurement |
|---|---|---|
| 2018/1/1 10:00:00 | (lat., long.) | 0.90 |
| 2018/1/1 10:00:01 | (lat., long.) | 0.83 |
| 2018/1/1 10:00:02 | (lat., long.) | 0.82 |
| 2018/1/1 10:00:03 | (lat., long.) | 0.43 |
| 2018/1/1 10:00:04 | (lat., long.) | 0.41 |
| 2018/1/1 10:00:05 | (lat., long.) | 0.88 |
| ... | ... | ... |

| Time | Positional information | Degree of reliability of GPS measurement | No. |
|---|---|---|---|
| 2018/1/1 10:00:00 | (lat., long.) | 0.90 | 1 |
| 2018/1/1 10:00:01 | (lat., long.) | 0.83 | 2 |
| 2018/1/1 10:00:02 | (lat., long.) | 0.82 | 3 |
| 2018/1/1 10:00:03 | (lat., long.) | 0.43 | 4 |
| 2018/1/1 10:00:04 | (lat., long.) | 0.41 | 5 |
| 2018/1/1 10:00:05 | (lat., long.) | 0.88 | 6 |
| ... | ... | ... | |

F I G. 13A

| ID | Pair |
|---|---|
| P1 | (No.1, No.2) |
| P2 | (No.1, No.3) |
| P3 | (No.1, No.6) |
| P4 | (No.2, No.3) |
| P5 | (No.2, No.6) |
| P6 | (No.3, No.6) |

F I G. 13B

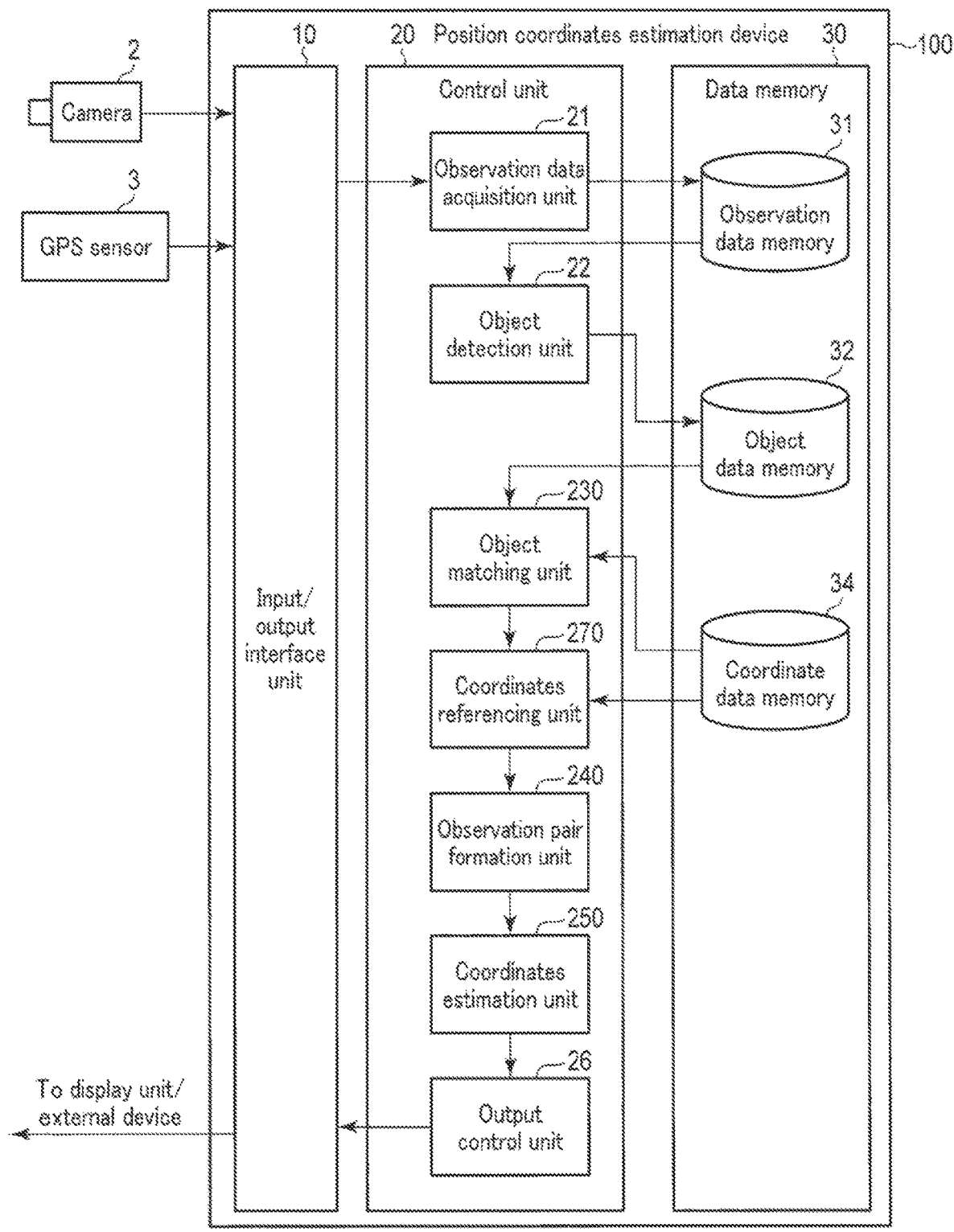
F I G. 15

POSITION COORDINATES ESTIMATION DEVICE, POSITION COORDINATES ESTIMATION METHOD, AND PROGRAM

CROSS-REFERENCE TO RELATED APPLICATIONS

This is a U.S. national phase application under 35 USC 371 of international application PCT/JP2019/031199, filed on Aug. 7, 2019, which claims priority to Japanese patent application No. 2018-156213, filed on Aug. 23, 2018. The entire disclosures of the above applications are incorporated herein by reference.

FIELD

Embodiments described herein relate generally to a device, method and program for estimating the position coordinates of objects surrounding a mobile object or of the mobile object itself, based on camera images captured from the mobile object.

BACKGROUND

Conventionally, a technique has been developed in an attempt to create a map, based on information acquired from sensors provided on a mobile object such as a vehicle, ship or robot, of an area surrounding such a mobile object (see, for example, Non-Patent Literature 1). The importance of maps of surrounding areas for future automatic driving systems has been widely acknowledged.

To create a map of a surrounding area, necessary map information may include road signs. An attempt is being made to detect road signs from video images captured by a vehicle-mounted camera while referring to a map database based on the Global Positioning System (GPS) information of a vehicle having a vehicle-mounted camera, thereby distinguishing fixed road signs from temporarily posted signs.

It is also important to accurately estimate the position of the vehicle on the surrounding map. A method for estimating the position of itself, called light detection and ranging or laser imaging detection and ranging (LIDAR), has been dominantly adopted. With this method, laser pulses are scanned to receive scattered light from the space of three dimensions at the emission position, a point cloud is formed from the distance measurement based on the time differences, and the three-dimensional space is densely built from the point cloud having three-dimensional coordinates. A technique called simultaneous localization and mapping (SLAM) has also been known, with which such a point cloud is processed to simultaneously conduct a self position estimation and environmental map creation. With visual-SLAM (V-SLAM), a point group is formed by directly processing video images acquired by the vehicle-mounted camera so as to estimate the position of itself.

CITATION LIST

Non Patent Literature

[Non-Patent Literature 1] "SIP Automated driving system for everyone a smile", May 11, 2018, Term 1, SIP Press Study Sessions (3rd Session), Internet <URL: http://www8.cao.go.jp/cstp/gaiyo/sip/press/jidosoko.pdf>

SUMMARY

Technical Problem

The technique disclosed in Non-Patent Literature 1, however, may not accurately estimate the position coordinates due to measurement errors included in the GPS information of a vehicle. As a technique for correcting a traveling path of a mobile object, map matching has been known, with which road network data and GPS data are matched. With this technique, however, the GPS data can be corrected only in a direction perpendicular to the center line of the street, which does not provide a sufficient correction. Although the use of sensors of a LIDAR type or the like may realize obtainment of accurate position coordinates, the costs of such sensors are too high to achieve practical use in general purpose schemes.

The present invention has been conceived in light of the above circumstances. The purpose of the invention is to offer a technique of accurately estimating the position coordinates of objects surrounding a mobile object or of the mobile object itself, without incorporating expensive sensors.

Solution to Problem

In order to solve the above issue, according to the first aspect of the invention, a position coordinates estimation device includes a camera image acquisition unit configured to acquire a plurality of camera images that are captured at different geographical locations and contain at least one identical stationary object; a position coordinates acquisition unit configured to acquire position coordinates of the geographical locations at which the corresponding camera images are captured; and a position coordinates estimation unit configured to estimate the position coordinates of the stationary object based on the position coordinates of the geographical locations and gaze vectors oriented to the stationary object on a coordinate system associated with the camera images, in each of the camera images.

According to the second aspect of the invention, the position coordinates estimation device of the first aspect further includes an image pair formation unit configured to selectively combine two of the camera images and form an image pair, and the position coordinates estimation unit estimates the position coordinates of the stationary object based on the position coordinates of the geographical locations and the gaze vectors oriented to the stationary object in the two camera images of the image pair.

According to the third aspect of the invention, in the device of the second aspect, the position coordinates acquisition unit acquires the position coordinates of the geographical locations, based on information received from a GPS satellite, and the image pair formation unit acquires information indicating a level of accuracy of the acquired position coordinates of the geographical locations, based on the information received from the GPS satellite, and forms the image pair by selectively combining camera images that correspond to geographical locations the position coordinates of which demonstrate levels of accuracy that exceed a predetermined threshold value.

According to the fourth aspect of the invention, in the device of the second or third aspect, the image pair formation unit forms a plurality of image pairs, and the position coordinates estimation unit calculates candidate values for the position coordinates of the stationary object from each of the image pairs, and estimates the position coordinates of the stationary object based on the calculated candidate values.

According to the fifth aspect of the invention, a position coordinates estimation device includes a camera image acquisition unit configured to acquire a camera image that contains at least two stationary objects having position coordinates that are known; a position coordinates acquisition unit configured to acquire the position coordinates of each of the at least two stationary objects; and a position coordinates estimation unit configured to estimate position coordinates of a location at which the camera image is captured, based on the position coordinates of each of the at least two stationary objects and a gaze vector oriented to each of the at least two stationary objects on a coordinate system associated with the camera images, in the camera image.

Advantageous Effects of Invention

According to the first aspect of the invention, with regard to multiple camera images captured from a mobile object, the position coordinates of a stationary object in the camera images can be estimated based on the gaze vectors to the stationary object and the position coordinates of the location at which each of the camera images is captured. By obtaining multiple gaze vectors with respect to the identical stationary object, the position coordinates of the stationary object can be estimated with a certain level of accuracy maintained through a variety of geometrical or statistical schemes even if the position coordinates of the imaging location include an error. Thus, as long as the position coordinates of each imaging location can be obtained with some method, the position coordinates of a stationary object can be accurately estimated by adopting a commonly used camera such as a vehicle-mounted camera, without the need for a costly sensor.

According to the second aspect of the invention, the position coordinates of a stationary object can be estimated using an image pair formed by selectively combining two camera images from among multiple camera images. In this manner, an image pair can be formed by setting desired standards for which the load on the system and a desired level of accuracy can be taken into consideration, and the position coordinates of the stationary object can be estimated based on such an image pair.

According to the third aspect of the invention, the accuracy of the position coordinates of a geographical location can be determined based on the information received from the GPS satellites so that camera images corresponding to the geographical locations having an accuracy of the position coordinates that exceeds a predetermined threshold value can be selectively combined into an image pair. In this manner, only the camera images corresponding to accurate position coordinates are employed for the estimation of the position coordinates of the stationary object, and therefore the position coordinates of the stationary object can be estimated with a high accuracy.

According to the fourth aspect of the invention, multiple image pairs are formed, and the definitive position coordinates are estimated from multiple candidate values estimated from the multiple image pairs. In this manner, with adverse effects of variations of samples taken into account, the accuracy of the estimation of the position coordinates of the stationary object can be improved.

According to the fifth aspect of the invention, a camera image of at least two stationary objects whose position coordinates are known is captured so that the position coordinates of the location at which the camera image is captured can be estimated based on the gaze vectors oriented to the stationary objects in the camera image and the position coordinates of the stationary objects. Thus, if a camera image of at least two stationary objects whose position coordinates are known can be acquired, the position coordinates of the location at which the image has been captured, and also the position coordinates of the mobile object on which the camera is mounted, can be accurately estimated with a commonly used camera such as a vehicle-mounted camera, without requiring a costly sensor.

In other words, according to the various aspects of the invention, a technique of accurately estimating the position coordinates of the objects surrounding the mobile object or of the mobile object itself, without adopting a costly sensor, can be offered.

BRIEF DESCRIPTION OF THE DRAWINGS

FIG. 3 is a block diagram showing a software configuration of the position coordinates estimation device according to the first embodiment of the present invention.

FIG. 13A is a diagram showing exemplary GPS measurement data for forming pairs of observation data.

FIG. 13B is a diagram showing exemplary observation pairs formed based on the data of FIG. 13A.

FIG. 15 is a block diagram showing a software configuration of a position coordinates estimation device according to the second embodiment of the present invention.

DETAILED DESCRIPTION

Embodiments of the present invention will be described below with reference to the drawings.

First Embodiment (Structure)
(1) System

Figure 1:
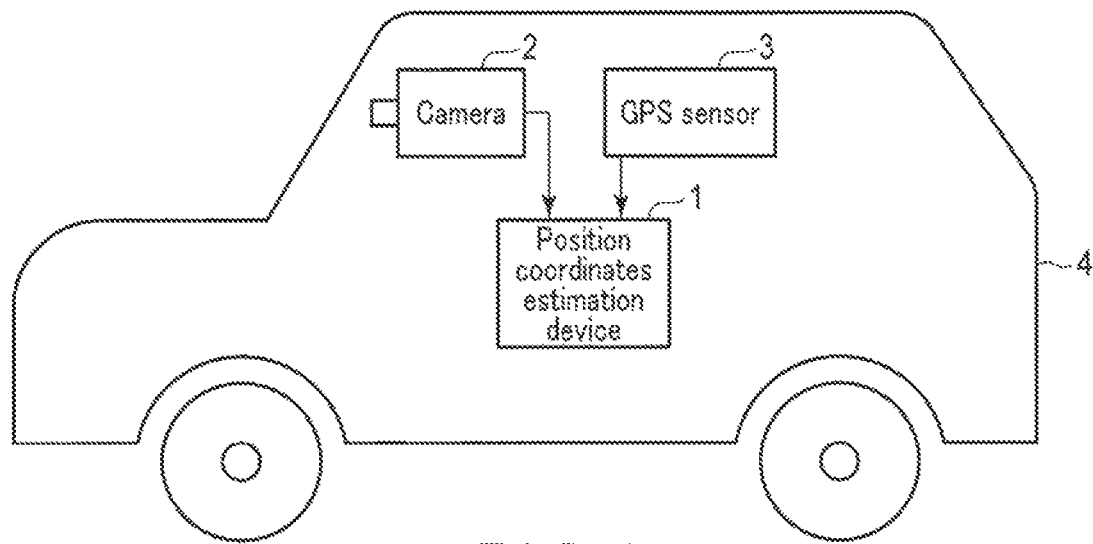
FIG. 1 is a schematic diagram showing the structure of a vehicle-mounted system incorporating a position coordinates estimation device according to embodiments of the present invention.

FIG. 1 shows an exemplary vehicle-mounted system incorporating a position coordinates estimation device according to an embodiment of the present invention. A vehicle 4 is illustrated as an example of a mobile object in FIG. 1. The vehicle 4 is not limited to a specific vehicle, but may be of any model and any carmaker and owned by anybody. Mobile objects may include any objects on which a sensor can be mounted, such as an automobile, motorcycle, bicycle, personal transporter, robot, pedestrian, ship, airplane, and drone. The vehicle-mounted system illustrated in FIG. 1 is therefore a mere example, and may be replaced with a smartphone carried by a pedestrian.

In the vehicle 4 of FIG. 1, which serves as a mobile object, a position coordinates estimation device 1 according to the embodiment, a camera 2, and a GPS sensor 3 are mounted.

For the camera 2, a solid state imaging device such as a charge coupled device (CCD) and complementary metal oxide semiconductor (CMOS) sensor is adopted. The installation position, orientation, and angle are designed such that its imaging range covers an area of a street in any direction including the traveling direction of the vehicle 4. The camera 2 acquires camera image data, and outputs the acquired data to the position coordinates estimation device 1.

The camera 2 may be provided specifically for the position coordinates estimation, but any camera capable of obtaining similar image data may be used, such as a dashcam or a vehicle-mounted camera installed for other purposes. When the mobile object is, for example, a motorcycle or bicycle, a camera attached to the helmet of the driver may be used. A camera integrated into a mobile terminal such as a smartphone or tablet carried by a passenger of the vehicle 4 may also be used. Types of the camera may include an infrared camera. The camera image data acquired by the camera may be moving image data, or still image data captured at certain time intervals.

The GPS sensor 3 receives GPS signals transmitted from multiple GPS satellites and performs distance measurement calculation, thereby calculating the latitude and longitude of the vehicle 4. The GPS measurement data including the calculated latitude and longitude is output to the position coordinates estimation device 1. In addition to the latitude and longitude (hereinafter may be referred to as "position coordinates"), the GPS measurement data may also include information indicating the degree of reliability of the GPS measurement. The degree of reliability of the GPS measurement is an indicator determined, for example, in accordance with the arrangement of GPS satellites. The acquisition of the position coordinates is not limited to the GPS sensor 3, and any other means that can exert similar effects may be used. For example, the positional information of a wireless base station or Wi-Fi access point may be used.

The position coordinates estimation device 1 is configured to estimate the position coordinates of an ambient object in a camera image, and has a structure as described below.

(2) Position Coordinates Estimation Device
(2-1) Hardware Configuration

Figure 2:
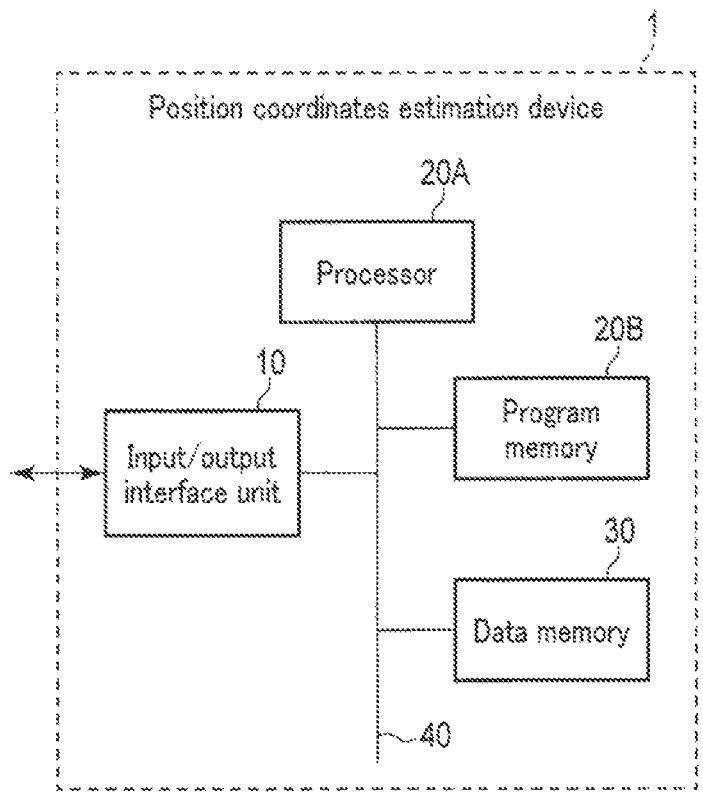
FIG. 2 is a block diagram showing a hardware configuration of the position coordinates estimation device according to the embodiments of the present invention.

FIG. 2 is a block diagram showing a hardware configuration of the position coordinates estimation device 1 according to the first embodiment of the present invention.

The position coordinates estimation device 1 may be configured by a personal computer, and include, as hardware components, an input/output interface unit 10, a hardware processor 20A such as a central processing unit (CPU), a program memory 20B, and a data memory 30, which are coupled to each other via a bus 40.

The input/output interface unit 10 may include one or more wired or wireless communication interface units. The input/output interface unit 10 receives information from external devices including the camera 2 and GPS sensor 3, and externally outputs the information generated by the position coordinates estimation device 1.

The program memory 20B may include, as a storage medium, a combination of a nonvolatile memory such as a hard disk drive (HDD) or solid state drive (SSD), in which writing and reading can be conducted at any time, and a nonvolatile memory such as a ROM. Programs necessary to execute various types of control processing according to the present embodiment are stored in the program memory 20B.

The data memory 30 may include, as a storage medium, a combination of a nonvolatile memory such as an HDD or SSD, in which writing and reading can be conducted at any time, and a volatile memory such as a random access memory (RAM). The data memory 30 is adopted to store data of various types that is acquired and created at various steps of the processing.

(2-2) Software Configuration

FIG. 3 is a block diagram showing a software configuration of the position coordinates estimation device 1 according to the first embodiment of the present invention, in association with the hardware configuration of FIG. 2.

The input/output interface unit 10 receives a vehicle-mounted camera image recorded by the camera 2 such as a dashcam installed on the vehicle 4 and positional information from the GPS sensor 3 installed on the vehicle 4, and outputs them to the control unit 20. The input/output interface unit 10 further externally outputs the data output from the control unit 20. For instance, the estimated position coordinates may be output as output results to a visualization means, which conducts mapping of the positional information upon a map, by way of the input/output interface unit 10. Alternatively, the input/output interface unit 10 may output and display the display data generated to display the estimation result of the position coordinates, for example, onto the display of the car navigation device (not shown) of the vehicle 4.

The memory region of the data memory 30 includes an observation data memory 31, an object data memory 32, an object-specific data memory 33, and a coordinate data memory 34.

The observation data memory 31 is adopted to store the camera image data obtained by the camera 2 and the GPS measurement data obtained by the GPS sensor 3 (hereinafter, the camera image data and GPS measurement data combined together may be referred to as "observation data"). The camera image data and GPS measurement data are connected to each other through date and time information.

The object data memory 32 is adopted to store the information that identifies the object detected in a camera image, together with the GPS measurement data connected to this camera image. An object denotes a physical object, particularly a stationary object, surrounding the vehicle 4 with the camera 2 mounted. Stationary objects may include fixtures such as road signs, traffic lights, utility poles, mailboxes, vending machines, buildings, and signs, and also objects that stay at a position at least for a certain length of time, such as parked vehicles and traffic cones. The stationary objects may further include other vehicles in a stopped state and pedestrians waiting at a traffic light.

The object-specific data memory 33 is adopted to store the camera image data sorted in accordance with individual objects detected and GPS measurement data.

The coordinate data memory 34 is adopted to store position coordinate data of an object, together with the image or identification information of the object.

The above memories 31 to 34 are not essential components. For instance, they may be arranged in an external memory device such as a cloud database server. If this is the case, the position coordinates estimation device 1 may access the cloud database server through a communication network to acquire necessary data.

The control unit 20 is constituted by the above hardware processor 20A and program memory 20B, and includes, as software processing functions, an observation data acquisition unit 21, an object detection unit 22, an object matching unit 23, an observation pair formation unit 24, a coordinates estimation unit 25, and an output control unit 26. The processing functions of these units can be realized by the hardware processor 20A implementing the programs stored in the program memory 20B. Instead of the programs stored in the program memory 20B, the processing functions may be realized by programs provided through a network.

The observation data acquisition unit 21 sequentially receives through the input/output interface unit 10 the camera image data output from the camera 2 and the GPS measurement data output from the GPS sensor 3, and associates the camera image data with the GPS measurement data based on the date and time information to store in the observation data memory 31.

The object detection unit 22 performs a process of reading the camera image data from the observation data memory 31 and detecting in the image an object for which the position coordinates should be estimated, and stores the detection result in the object data memory 32 of the data memory 30. The object detection unit 22 may attach bounding box information, which indicates an object detected, to the camera image data and store the resultant data in the object data memory 32.

The object matching unit 23 reads the object-detected camera image data from the object data memory 32, sorts the data in which images of the identical object are captured, and stores the results in the object-specific data memory 33 of the data memory 30.

The observation pair formation unit 24 reads from the object-specific data memory 33 a data set of data items sorted in accordance with the objects, and forms a pair (also referred to as "observation pair" or "image pair") to calculate the position coordinates from camera images corresponding to at least two observation locations at which images of the identical object are captured. The observation pair formation unit 24 outputs the formed observation pair to the coordinates estimation unit 25.

The coordinates estimation unit 25 calculates candidate coordinates of the object, using the data of the observation pairs formed by the observation pair formation unit 24. The coordinates estimation unit 25 calculates the candidate coordinates for each observation pair, further calculates the definitive position coordinates from the distribution of the calculated candidate coordinates, and stores these coordinates together with the image of the object in the coordinate data memory 34.

The output control unit 26 performs a process of reading the position coordinate data of the object stored in the coordinate data memory 34 and externally outputting the data through the input/output interface unit 10.

(Operations)

Figure 4:
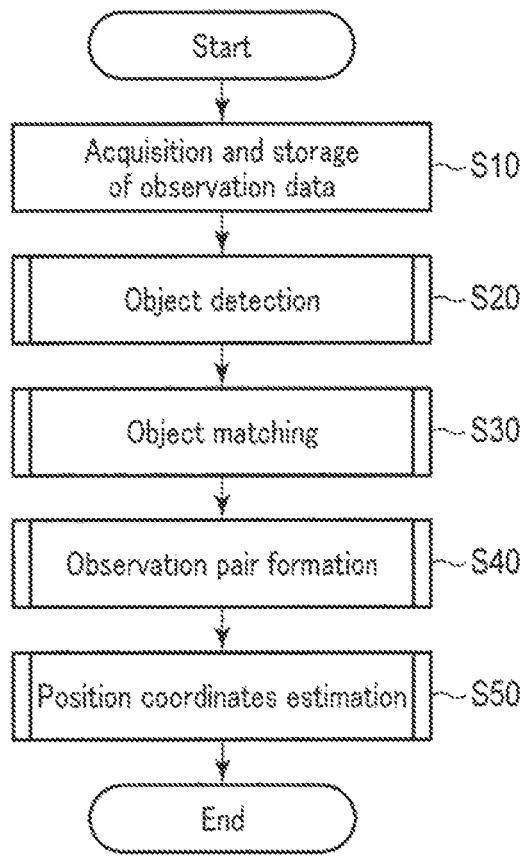
FIG. 4 is a flowchart showing the entire processing procedure and the descriptions of each processing routine executed by the position coordinates estimation device of FIG. 3.

Next, the information processing operations of the position coordinates estimation device 1 configured as above will be described. FIG. 4 is a flowchart showing an exemplary procedure and descriptions of this processing.

(1-1) Acquisition and Accumulation of Observation Data

First, at step S10, the control unit 20 of the position coordinates estimation device 1 acquires, as observation data, the camera image data and GPS measurement data through the input/output interface unit 10 under the control of the observation data acquisition unit 21, and stores the data in the observation data memory 31. Here, as the camera image data, a video image of the front view is captured during driving by the camera 2 mounted on the vehicle 4.

Figures 10A, 10B:
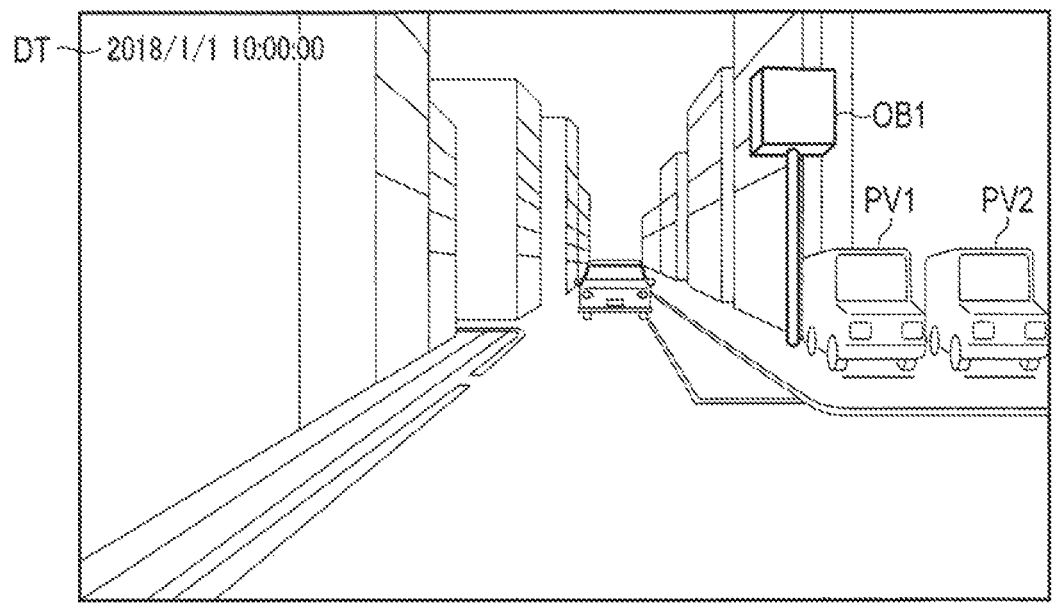
FIG. 10A is a diagram showing exemplary camera image data acquired by a vehicle-mounted camera.
FIG. 10B is a diagram showing exemplary GPS measurement data obtained by a GPS sensor.

FIG. 10A shows exemplary camera image data stored in the observation data memory 31. In the camera image of FIG. 10A, a sign OB1 is included as an example of an object, in addition to a street on which the vehicle 4 is travelling, lanes drawn on the street, a sidewalk, surrounding buildings, a vehicle driving in front, and parked vehicles PV1 and PV2. The camera image data also includes date and time information DT of image capturing.

FIG. 10B shows exemplary GPS measurement data stored in the observation data memory 31. The GPS measurement data may include information of the time at which the GPS measurement is performed, the measured positional information, and information indicating the degree of reliability of the GPS measurement. In FIG. 10B, the positional information is shown as (lat., long.) for the sake of simplicity. However, in the actual data, specific numerical values are acquired for the latitude and longitude. The same applies to the subsequent drawings.

Here, the camera image data and GPS measurement data are measured approximately at intervals of at least one second, and the times of the data are synchronized in a granularity of approximately one second. The items of the camera image data are stored in the observation data memory 31 in association with the corresponding items of GPS measurement data based on the date and time information.

(1-2) Detection of Object

Figure 5:
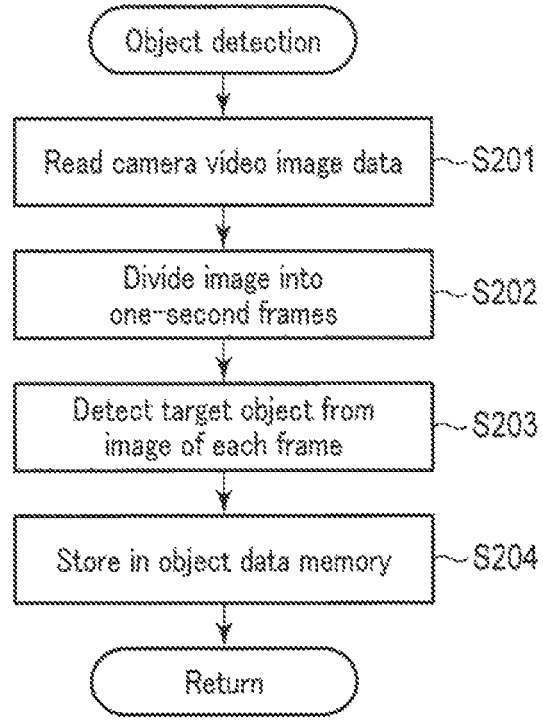
FIG. 5 is a flowchart showing an exemplary procedure and descriptions of the object detection processing routine of FIG. 4.

At step S20, the control unit 20 of the position coordinates estimation device 1 performs an object detection process under the control of the object detection unit 22. FIG. 5 is a flowchart showing an exemplary procedure and descriptions of the process performed by the object detection unit 22.

At step S201, the object detection unit 22 first reads camera video image data (file) from the observation data memory 31. This file includes the time points of image capturing in units of seconds.

At step S202, the object detection unit 22 divides the camera video image, for example, into one-second frames. This process may be performed using FFmpeg (video processing software) or the like.

At step S203, the object detection unit 22 performs a process for detecting an object from the image of each frame. This process may be performed using a scheme such as YOLOv2 (object detection algorithm) (see, for example, https://arxiv.org/abs/1612.08242). If one frame includes multiple objects, these objects are detected.

At step S204, the object detection unit 22 performs a process of storing the detection result in the object data memory 32. The object detection unit 22 may attach bounding box information, which indicates an object detected, to the camera image data, and store the data in the object data memory 32. The object-detected camera image data is stored in the object data memory 32 in association with the GPS measurement data as shown in FIG. 10B.

Figure 11:
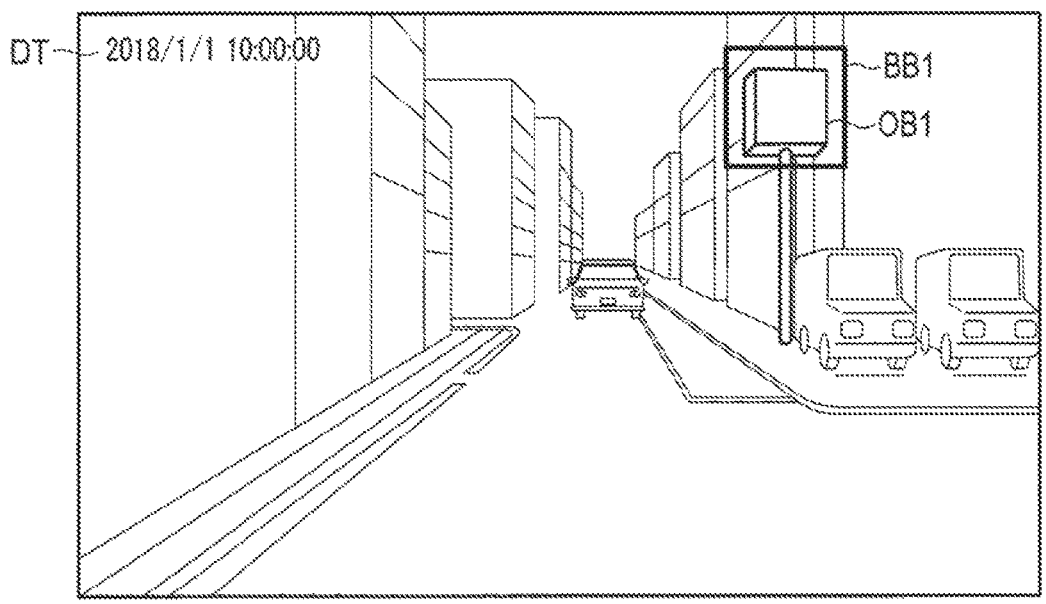
FIG. 11 is a diagram showing exemplary camera image data in which an object has been detected.

FIG. 11 shows an example of object-detected camera image data stored in the object data memory 32. When the position coordinates of a sign OB1, for example, posted in a town are to be estimated, the object detection unit 22 performs an object detection to detect the sign OB1 and stores rectangular information BB1 in connection with the detected sign OB1. Targeted objects are not limited to store signs but may include road signs, vehicles parked on the street, and vending machines.

(1-3) Object Matching

Figure 6:
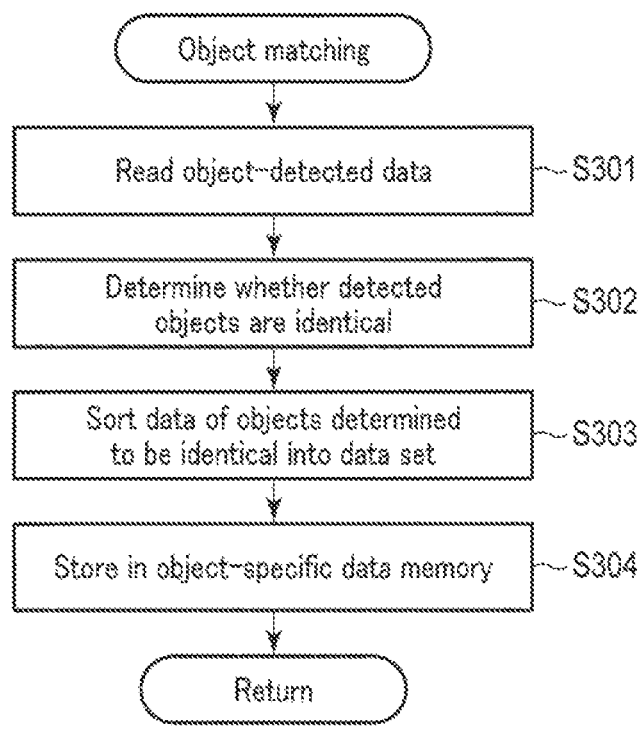
FIG. 6 is a flowchart showing an exemplary procedure and descriptions of the object matching processing routine of FIG. 4.

At step S30, the control unit 20 of the position coordinates estimation device 1 performs an object matching process under the control of the object matching unit 23. FIG. 6 is a flowchart showing an exemplary procedure and descriptions of the process performed by the object matching unit 23.

First, at step S301, the object matching unit 23 reads object-detected camera image data from the object data memory 32 of the data memory 30.

Next, at step S302, the object matching unit 23 performs a process of determining whether the objects detected in different frames are identical. The determination process may be performed by image matching. According to this embodiment, template matching that uses a correlation value is adopted as image matching, where the point of the correlation value reaching the maximum is determined to be an image correspondence point. For a correlation value, the following normalized correlation is used.

$$\text{Corr} = \frac{\sigma_{img1,img2}}{sd_{img1} \cdot sd_{img2}} \quad [\text{Equation1}]$$

Here, Corr represents a correlation coefficient, $\sigma_{xy}$ represents a covariance of xy, and $sd_x$ represents the standard deviation of x. Whether or not the objects are identical can be determined by setting a threshold value for the correlation value.

At step S303, the object matching unit 23 sorts the data of objects that are determined to be identical, into the same data set. For example, after detection of a sign in a town, a process may be performed to search for the same sign detected in different frames captured by the same automobile, or the same sign detected in camera images captured by different automobiles. The data determined to contain the same sign is sorted in accordance with such a data group.

At step S304, the object matching unit 23 stores the sorted result in the object-specific data memory 33 of the data memory 30.

Figure 12:
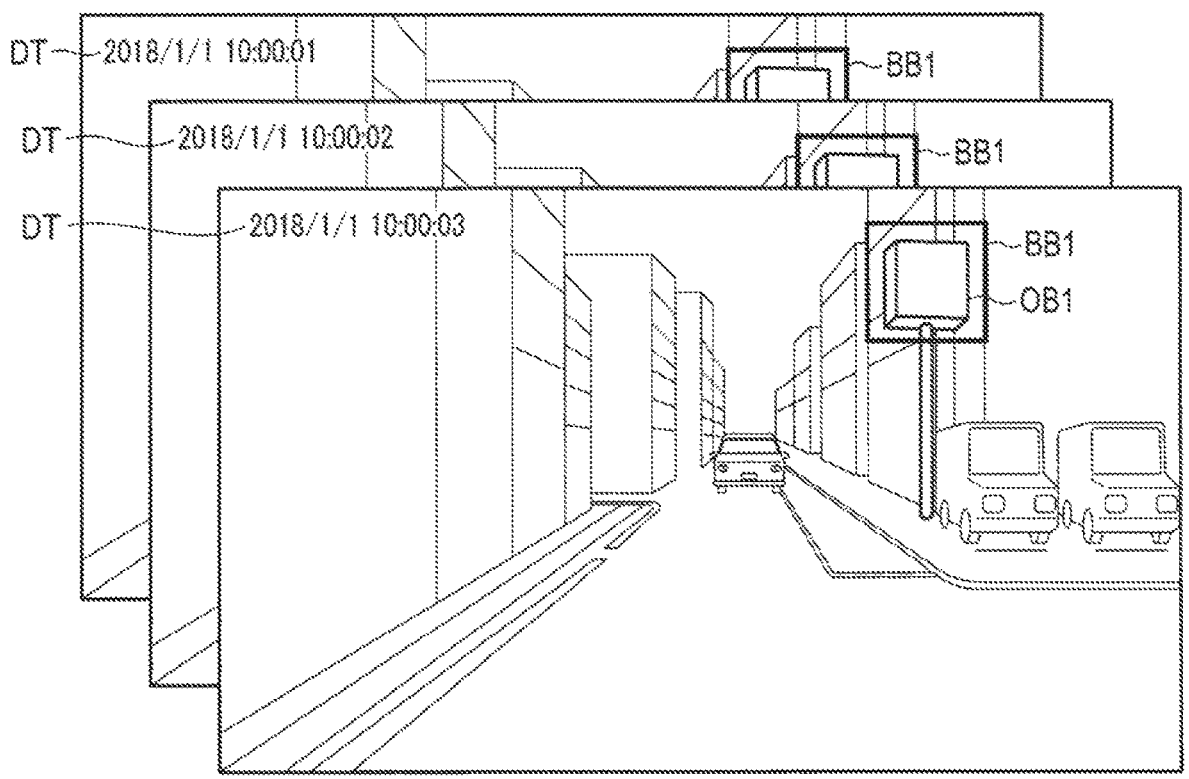
FIG. 12 is a diagram showing exemplary image data sorted into data items in which an identical object has been detected.

FIG. 12 shows image data sorted in accordance with objects, which is stored in the object-specific data memory 33. As the date and time information DT, the same sign OB1 is detected in three images time-stamped with 10:00:01, 10:00:02, and 10:00:03 on 2018/1/1, to which rectangular information BB1 is attached. Each data item of the image data sorted in accordance with objects is associated with the GPS measurement data as indicated in FIG. 10B, and stored in the object-specific data memory 33.

(1-4) Formation of Observation Pairs

Figure 7:
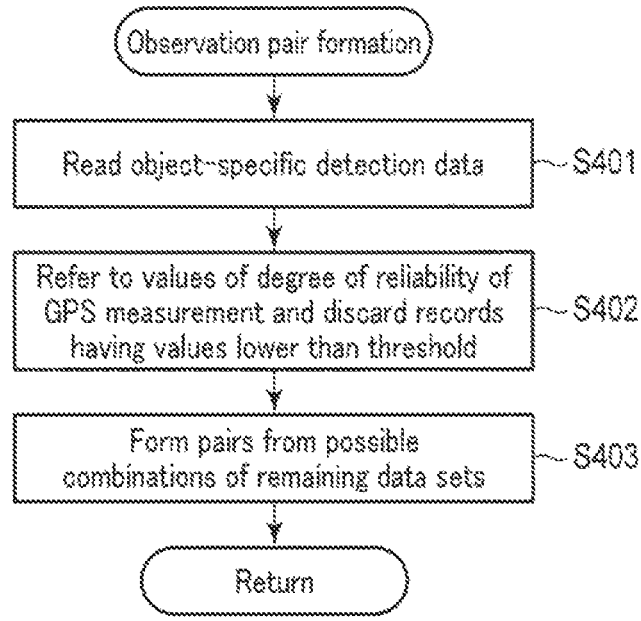
FIG. 7 is a flowchart showing an exemplary procedure and descriptions of the observation pair formation processing routine of FIG. 4.

At step S40, the control unit 20 of the position coordinates estimation device 1 performs an observation pair formation process under the control of the observation pair formation unit 24. FIG. 7 is a flowchart showing an exemplary procedure and descriptions of the process performed by the observation pair formation unit 24.

First, at step S401, the observation pair formation unit 24 reads data sets sorted in accordance with objects, which are stored in the object-specific data memory 33 of the data memory 30. Here, all the data sets of the detected objects may be read out, or data sets of a specific (preferred) object may be read out.

Next, at step S402 prior to the formation of observation data pairs from at least two observation locations at which images of the identical object has been captured, the observation pair formation unit 24 performs a process of determining records having accurate positional information. At the time of the GPS measurement, the indicator that indicates the degree of reliability of the GPS measurement is also measured, and therefore this indicator is used to form pairs of data items having high degrees of reliability. For instance, of the GPS information having different time points in the data sets, the values in the column that indicates the degree of reliability of the GPS measurement are referred to. Any records demonstrating a low degree of reliability are discarded so that pairs of observation data can be formed from records demonstrating high degrees of reliability.

Indicators for the degree of reliability include one that takes into account the influence of the arrangement of GPS satellites. Computational errors in positioning of a GPS receiver are known to vary in accordance with the correlation of the arrangement of GPS satellites and the location of the GPS receiver. A decrease in accuracy due to the arrangement of GPS satellites with respect to the measurement point is called geometric dilution of precision (GDOP). The DOP in the horizontal direction is referred to as horizontal dilution of precision (HDOP). An HDOP having a greater value indicates low precision in the horizontal positional measurement. If HDOP is adopted as an indicator of the degree of reliability, data having an HDOP value higher than a threshold value means the measured latitude and longitude are possibly inaccurate, and thus the record of this data may be removed.

FIG. 13A shows a concept of GPS measurement data for forming pairs of observation data. In this drawing, specific values for latitudes and longitudes are omitted. It is assumed here that the identical object is detected in all of the six frames captured every second from 2018/1/1 10:00:00 to 2018/1/1 10:00:05. The frames are numbered for the sake of explanation. From the values of the reliability of the GPS measurement, it is highly possible that the measured latitudes and longitudes of Nos. 4 and 5 may be inaccurate.

Thus, in this example, the records of Nos. 4 and 5 are removed, and the process proceeds to the next step.

Next, at step S403, the observation pair formation unit 24 forms pairs of observation data from the remaining records to calculate the position coordinates.

FIG. 13B shows exemplary pairs formed as P1 to P6. As mentioned earlier, the records of Nos. 4 and 5 in FIG. 13A have been removed, and therefore six data items are obtained as observation pairs from the remaining four records. In this example of the process flow, since the records with GPS measurements having a low degree of reliability have already been removed, every combination of records of the remaining data can be formed as a pair. For the data targeted as observation pairs, a threshold value may be set for the HDOP, or only a certain proportion of data items having the highest degrees of reliability (having a low HDOP value) from among all the observation data items may be adopted.

(1-5) Estimation of Position Coordinates

Figure 8:
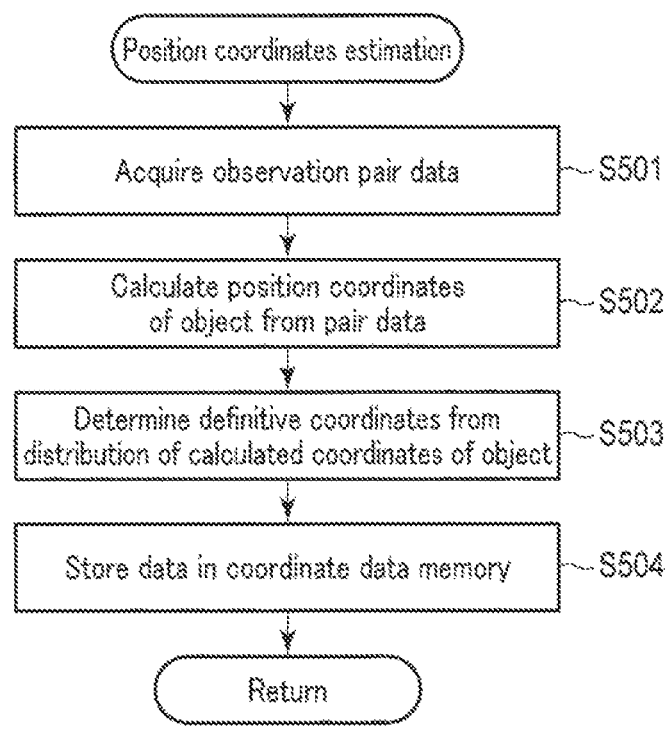
FIG. 8 is a flowchart showing an exemplary procedure and descriptions of the position coordinates estimation processing routine of FIG. 4.

At step S50, the control unit 20 of the position coordinates estimation device 1 performs a position coordinates estimation process under the control of the coordinates estimation unit 25. FIG. 8 is a flowchart showing an exemplary procedure and descriptions of the process performed by the coordinates estimation unit 25.

First, at step S501, the coordinates estimation unit 25 acquires observation pair data formed by the observation pair formation unit 24.

Next, at step S502, the coordinates estimation unit 25 calculates the position coordinates of the object using the data of each observation pair. In this example, the position coordinates of the object are calculated on the photogrammetry principle of the principal point of the vehicle-mounted camera 2 being in alignment with the position of the object on the image and the actual position of the object on the ground coordinates.

Figure 9A:
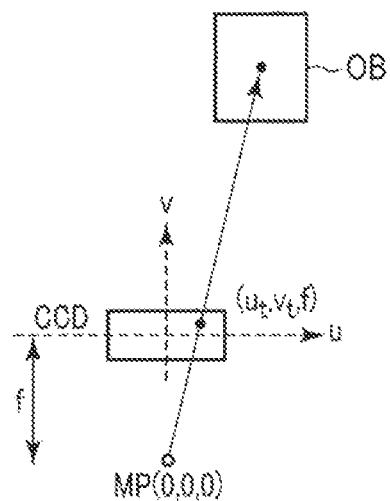
FIG. 9A is a diagram showing an example of photogrammetry incorporated in the position coordinates estimation process of FIG. 8.

FIG. 9A is a diagram showing an example of photogrammetry according to the present embodiment. First, a gaze vector in a direction from the camera (CCD) to the object OB is calculated. Here, the image coordinates are replaced with the coordinates of the camera coordinate system in which the principal point of the camera serves as the origin point. In the camera coordinate system, the image coordinates are determined with the center of the image being at the coordinates (0, 0), and the distance between the principal point MP and the CCD in the depth direction is the focal distance f (in units of pixels). In FIG. 9A, t represents the time, and $u_t$ and $v_t$ represent image coordinates (in units of pixels) of the object at time t.

Next, the gaze vector of the camera coordinate system is converted to the system of ground coordinates (map coordinates). The conversion of the coordinates can be achieved through the rotation of the gaze vector in accordance with the following equation.

$$\begin{pmatrix} x'_t \\ y'_t \\ z'_t \end{pmatrix} = \begin{pmatrix} 1 & 0 & 0 \\ 0 & \cos\omega & -\sin\omega \\ 0 & \sin\omega & \cos\omega \end{pmatrix}$$ [Equation 2]

$$\begin{pmatrix} \cos\varphi & 0 & \sin\varphi \\ 0 & 1 & 0 \\ -\sin\varphi & 0 & \cos\varphi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} u_t \\ v_t \\ f \end{pmatrix}$$

Here, $(x'_t, y'_t, z'_t)$ represents a vector (in units of m) oriented from the position of the principal point of the camera at time t to the position of the object, and ω, φ, and κ represent respective angles of the three axes of the camera coordinates with respect to the positive direction of the ground coordinates. The rotational angles ω, φ, and κ may be acquired with various methods. For instance, the rotational angles may be acquired by use of a triaxial acceleration sensor when installing a camera. Alternatively, without taking an altitude into account in the GPS information, biaxial rotation, where ω=0 and φ=0, may be considered. If this is the case, K may be calculated from the following equation.

$$K_t = a\tan((x_{t+1}-x_t)/(y_{t+1}-y_t))$$

In this equation, a tan represents the arc tangent (arctan), and t represents time.

Figure 9B:
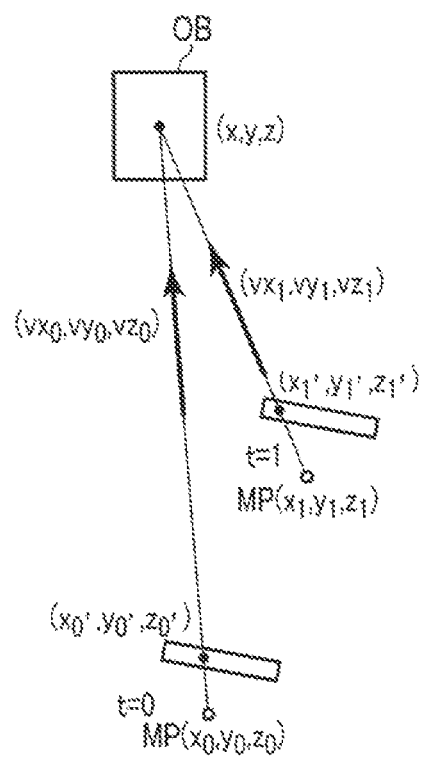
FIG. 9B is a diagram showing an example of intersection point calculation processing for gaze vectors used in the position coordinates estimation process of FIG. 8.

FIG. 9B is a diagram indicating the relationship between the position coordinates (x, y, z) of the object and the gaze vectors $(vx_0, vy_0, vz_0)$ and $(vx_1, vy_1, vz_1)$ of two frames. According to this embodiment, in order to estimate the position coordinates of the object, gaze vectors of multiple frames are prepared and subjected to a coordinate conversion to the ground coordinates, and their intersection point (intersection of the lines obtained by extending the gaze vectors) is calculated. The calculated intersection point (x, y, z) represents the ground coordinates of the object. In FIG. 9B, the observation data items acquired at locations at t=0 and t=1 are employed as an observation pair. The coordinates $(x_0, y_0, z_0)$ and $(x_1, y_1, z_1)$ represent the coordinates (ground coordinates) of the principal point MP of the camera at t=0 and t=1, respectively, and these coordinates are acquired as GPS measurement data (latitude, longitude, and altitude). The coordinates $(x'_0, y'_0, z'_0)$ and $(x'_1, y'_1, z'_1)$ represent vectors oriented from the principal point of the camera to the position of the object at t=0 and t=1, respectively, from the above coordinate conversion equation. If multiple observation pairs are available, the position coordinates of the object are calculated from each of the observation pairs.

Next, at step S503, the coordinates estimation unit 25 determines the most likely coordinates from the distribution of the data of the calculated coordinates of the object, to be definitive coordinates. When multiple observation pairs are incorporated, multiple coordinate data candidates are obtained. The definitive coordinates may be determined by adopting the average value or median value of such calculated coordinate data candidates. Other values may be adopted as definitive coordinates from the coordinate data candidates. When a new coordinate data candidate is calculated, this may be merged with the previously calculated coordinate data candidates to obtain a new average value or median value. In this manner, more accurate coordinate values can be obtained with more data collected. Alternatively, the cycle of updates may be set such that the average value or median value of the coordinate data candidates obtained for a time span of the last one month are adopted as coordinate data candidates. This will accurately correct the position of, for example, a bus stop that has been moved, or a sign that has been newly posted.

Figure 14:
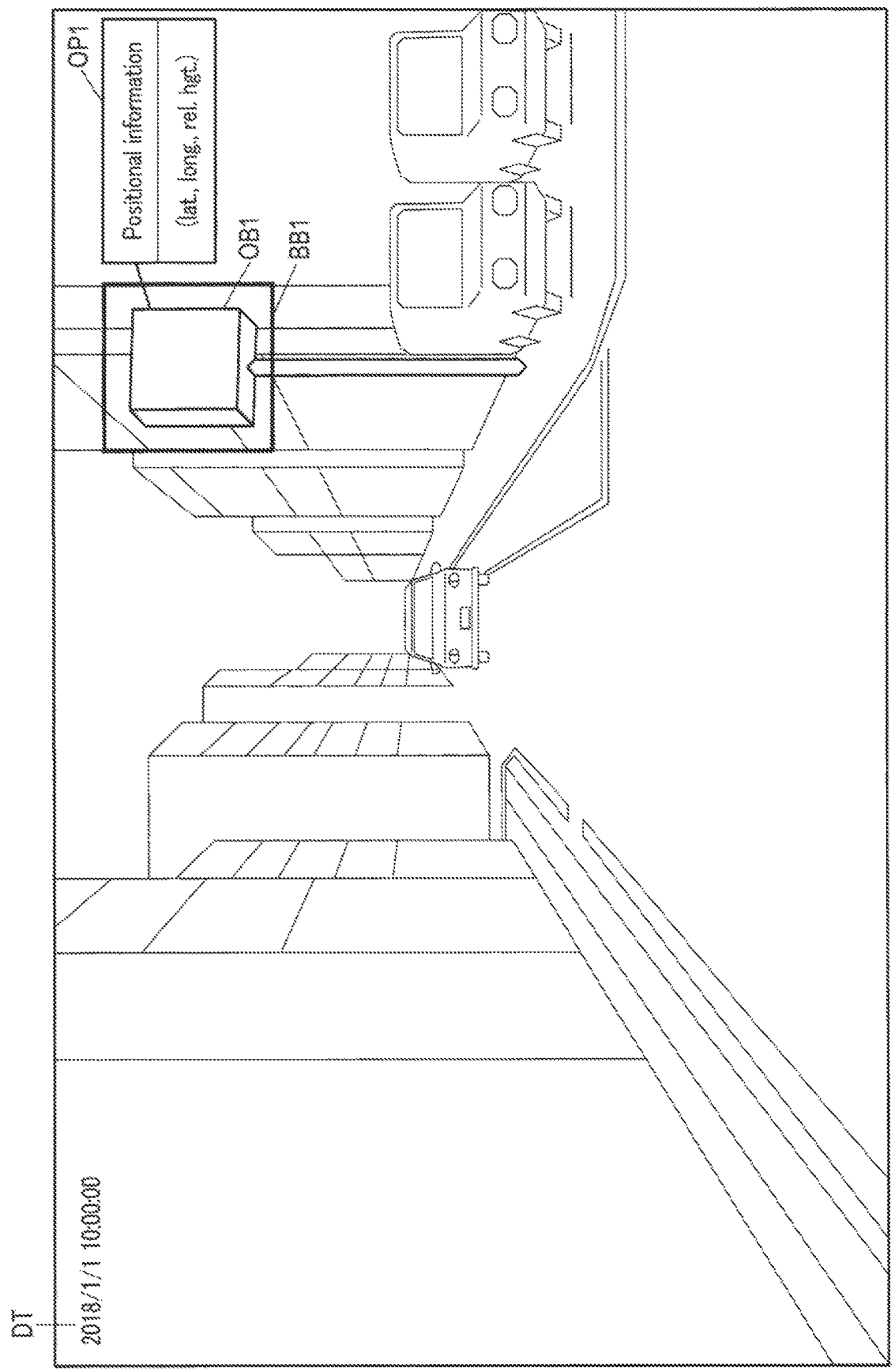
FIG. 14 is a diagram showing an object the position coordinates of which are estimated.

At step S504, the coordinates estimation unit 25 stores the determined definitive coordinates in the coordinate data memory 34. FIG. 14 shows an exemplary data image stored in the coordinate data memory 34. Here, the position coordinates are stored in association with the image data of the corresponding object. In FIG. 14, the sign OB1, for which the position coordinates are to be estimated, and the positional information OP1 of this sign OB1 including the latitude, longitude, and relative height, are illustrated. The relative height here represents, not an altitude, but a height with respect to the installation position of the vehicle-mounted camera. The sign may be provided with an ID to be distinguished from other signs. For instance, road network data is commonly used as map information, and in this road network data, an ID is assigned to each road. An ID system may be established, in which IDs are assigned to signs in association with road IDs.

Thereafter, in response to an operator's manipulation, the control unit 20 of the position coordinates estimation device 1 reads the determined definitive position coordinates from the coordinate data memory 34 under the control of the output control unit 26, and outputs these coordinates to an external device by way of the input/output interface unit 10.

Effects of First Embodiment

As described above, the position coordinates estimation device 1 according to the first embodiment acquires camera image data based on the video image output from the camera 2 mounted on the vehicle 4, and the GPS measurement data output from the GPS sensor 3 mounted on the vehicle 4; and, based on multiple images of the identical object captured at different observation locations and the positional information of the vehicle 4 corresponding to these images, calculates the intersection point of the gaze vectors to the object in the image, thereby estimating the position coordinates of the object.

As a result, without requiring a costly sensor, the position coordinates of surrounding objects that can be observed from a mobile object such as a vehicle 4 can be accurately estimated with a commonly used vehicle-mounted camera and GPS sensor.

In addition, in the calculation of the intersection point of the gaze vectors, the observation pair formation unit 24 removes the position coordinates indicating a low degree of reliability, and forms a pair from image data that includes the position coordinates indicating a high degree of reliability. Furthermore, the coordinates estimation unit 25 calculates data of the position coordinates from different pairs, and determines the most likely position coordinates from the distribution of the data. Thus, even if the GPS information of the mobile object contains a measurement error, the position coordinates of the object can be accurately estimated. The GPS error may be a random error or a systematic error. If it is a systematic error, the observation pair formation unit 24 can eliminate the adverse effects of such an error as much as possible. If it is a random error, the coordinates estimation unit 25 can statistically eliminate the adverse effects of the error by adopting the average value or median value of the distribution of the coordinates as a definitive value.

As a result, the position coordinates estimation device 1 according to the first embodiment automatically detects objects including road signs and shop signs in town and accurately estimates their position coordinates to map the objects onto a map. Thus, automatic acquisition of an accurate and reliable map with constantly updated information reflected can be realized.

Second Embodiment

A position coordinates estimation device 100 according to the second embodiment of the present invention is configured to estimate the coordinates of the location from which a camera image is captured (i.e., the location of the mobile object 4 itself), based on the position coordinates of the surrounding objects captured in the camera image.

(Structure)

The position coordinates estimation device 100 according to the second embodiment may adopt a hardware configuration similar to that of the position coordinates estimation device 1 explained in the first embodiment. The detailed explanation of the hardware configuration is therefore omitted.

FIG. 15 is a block diagram showing the software configuration of the position coordinates estimation device 100 according to the second embodiment of the present invention. In this drawing, the functional units that are similar to those of the position coordinates estimation device 1 according to the first embodiment will be given the same reference numerals as in FIG. 3, and the detailed explanation thereof will be omitted. The position coordinates estimation device 100 according to the second embodiment may be realized in the vehicle-mounted system illustrated in FIG. 1.

In the same manner as the position coordinates estimation device 1, the position coordinates estimation device 100 may be constituted by a personal computer, and include, as hardware components, an input/output interface unit 10, a control unit 20, and a data memory 30.

The input/output interface unit 10 may include one or more wired or wireless communication interface units. The input/output interface unit 10 receives various kinds of information from the camera 2 and GPS sensor 3 mounted on the vehicle 4 and outputs the information to the control unit 20. In this embodiment, however, the GPS information does not always need to be received. The input/output interface unit 10 further externally outputs the data output from the control unit 20.

For the data memory 30, a nonvolatile memory such as HDD or SSD, on which write and read operations can be performed at any time, may be adopted as a storage medium. As memory regions necessary to realize this embodiment, an observation data memory 31, an object data memory 32, and a coordinate data memory 34 are included.

The observation data memory 31 is used to store at least the camera image data obtained by the camera 2. If the GPS measurement data having the corresponding date and time information is obtained, the observation data memory 31 may store the camera image data in association with this GPS measurement data.

The object data memory 32 is used for storage of the information that identifies an object detected in a camera image. If there is any corresponding GPS measurement data, the object-detected camera image data is stored in association with this GPS measurement data.

The coordinate data memory 34 is used for storage of the position coordinate data of the object that has been estimated or acquired. In this embodiment, the position coordinates of the object are stored in association with the image data that contains this object.

The above memories 31, 32 and 34 are not essential components, and may be arranged in an external memory device such as a cloud database server. If this is the case, the position coordinates estimation device 100 makes an access to the cloud database server through a communication network to acquire necessary data.

The control unit 20 is constituted by a hardware processor such as CPU, which is not shown in the drawings, and a program memory. To implement the processing functions of this embodiment, the control unit 20 includes an observation data acquisition unit 21, an object detection unit 22, an object matching unit 230, a coordinates referencing unit 270, an observation pair formation unit 240, a coordinates estimation unit 250, and an output control unit 26. All of the processing functions of these units can be realized by the hardware processor executing the programs stored in the program memory. Instead of the programs stored in the program memory, the processing functions may be realized by programs provided through a network.

The observation data acquisition unit 21 sequentially receives at least the camera image data output from the camera 2 through the input/output interface unit 10, and stores the data in the observation data memory 31. If the GPS measurement data output from the GPS sensor 3 can also be acquired, the observation data acquisition unit 21 also sequentially receives GPS measurement data through the input/output interface unit 10, and stores the data in association with the camera image data based on the date and time information, in the observation data memory 31.

The object detection unit 22 performs a process of reading the camera image data from the observation data memory 31 and detecting an object therein, and stores the result into the object data memory 32 of the data memory 30. The object detection unit 22 may attach bounding box information indicating an object detected, to the camera image data, and store the resultant data in the object data memory 32.

The object matching unit 230 reads the object-detected camera image data from the object data memory 32, reads the positional information-attached object data from the coordinate data memory 34, and determines whether or not the identical object is contained in the object-detected camera image and the positional information-attached object data stored in the coordinate data memory 34.

When the object matching unit 230 determines that the identical object is contained in the data of the object data memory 32 and the data of the coordinate data memory 34, the coordinates referencing unit 270 extracts the position coordinates of this object from the coordinate data memory 34. According to the present embodiment, at least two objects positioned at different geographical locations, such as a sign and a utility pole, or a sign and a vending machine, are detected in a single camera image, and the coordinates referencing unit 270 extracts the position coordinates of at least two locations relating to these objects from the coordinate data memory 34.

The observation pair formation unit 240 forms a pair from the position coordinates information of at least two locations (two objects) extracted by the coordinates referencing unit 270. If the position coordinates of three locations or more are extracted, a pair can be formed from each of the possible combinations.

The coordinates estimation unit 250 calculates the candidate position coordinates based on the pairs formed by the observation pair formation unit 240. The position coordinates of the imaging location (mobile object 4) can be estimated by acquiring the intersection point of the lines that extend from the gaze vectors to the objects in the same manner as in the first embodiment. The candidate coordinates are calculated for each observation pair, and the definitive coordinates are calculated from the distribution of the calculated coordinates.

(Operations)

Figure 16:
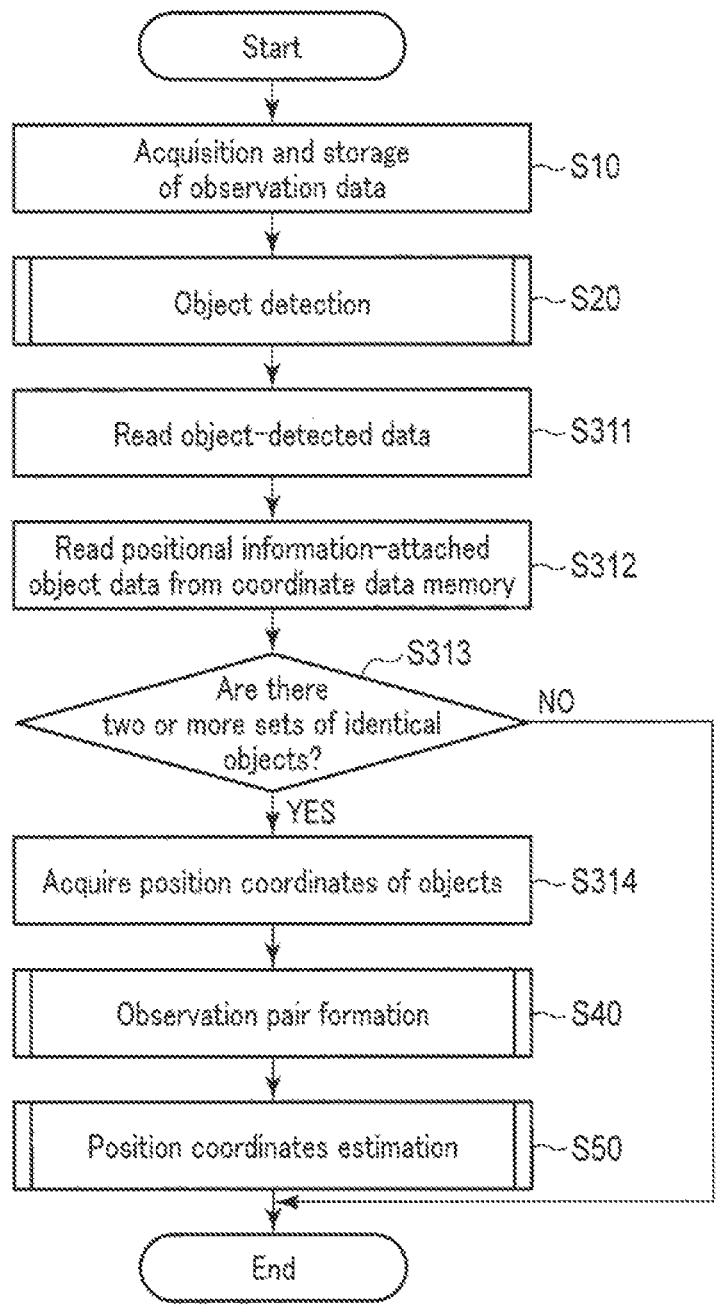
FIG. 16 is a flowchart showing the entire processing procedure and the descriptions of each processing routine executed by the position coordinates estimation device of FIG. 15.

Next, the information processing operations of the position coordinates estimation device 100 configured as above will be described. FIG. 16 is a flowchart showing an exemplary procedure and descriptions of the processing. In this drawing, the processing operations that are similar to those of the position coordinates estimation device 1 according to the first embodiment will be given the same reference numerals as in FIG. 4, and the detailed explanation thereof will be omitted.

(2-1) Acquisition and Accumulation of Observation Data

First, at step S10, the control unit 20 of the position coordinates estimation device 100 acquires at least camera image data, and, if possible, GPS measurement data through the input/output interface unit 10 under the control of the observation data acquisition unit 21, and stores the data in the observation data memory 31. As camera image data, the video image of the front view is captured during driving by the vehicle-mounted camera 2 of the vehicle 4 and acquired approximately at every second while measuring the time intervals. If the GPS measurement data is acquired, the camera image data is stored in association with the GPS measurement data based on the date and time information.

(2-2) Detection of Object

At step S20, the control unit 20 of the position coordinates estimation device 100 performs an object detection process under the control of the object detection unit 22. The object detection process may be performed using the commonly known Yolov2 algorithm or the like in the same manner as the first embodiment, and if a frame contains multiple objects, these objects are detected. According to the second embodiment, only frames which each contain at least two objects will be used for the subsequent processing operations.

(2-3) Object Matching

Next, the control unit 20 of the position coordinates estimation device 100 performs an object matching process under the control of the object matching unit 230.

At step S311, the object matching unit 230 reads the object-detected camera image data from the object data memory 32 of the data memory 30. As mentioned above, each of the image frames in the camera image data to be read out contains two or more objects.

At step S312, the object matching unit 230 reads the positional information-attached object data from the coordinate data memory 34 of the data memory 30. Such data may be the stored data for which the position coordinates have already been estimated with the method according to the first embodiment, or may be data acquired from an external database.

At step S313, the object matching unit 230 determines whether or not two or more sets of identical objects are contained both in the object-detected camera image data and the data in the coordinate data memory 34. The range of the data to be read from the coordinate data memory 34 may be restricted in advance based on the GPS information obtained from the GPS sensor 3 of the mobile object 4 so as to reduce the load of the subsequent processes. For the determination of identical objects, the normalized correlation can be adopted in the same manner as in the first embodiment.

If it is determined at step S313 that the coordinate data memory 34 contains no object identical to any object in the camera image data, or only one set of identical objects, the process is terminated. On the other hand, if it is determined at step S313 that two sets of identical objects can be found, the process proceeds to step S314.

Thereafter, at step S314, the control unit 20 of the position coordinates estimation device 100 extracts from the coordinate data memory 34 the position coordinates of the two identical objects or more that are determined by the object matching unit 230 as being shared by the camera image and the data of the coordinate data memory 34, under the control of the coordinates referencing unit 270.

Figure 17:
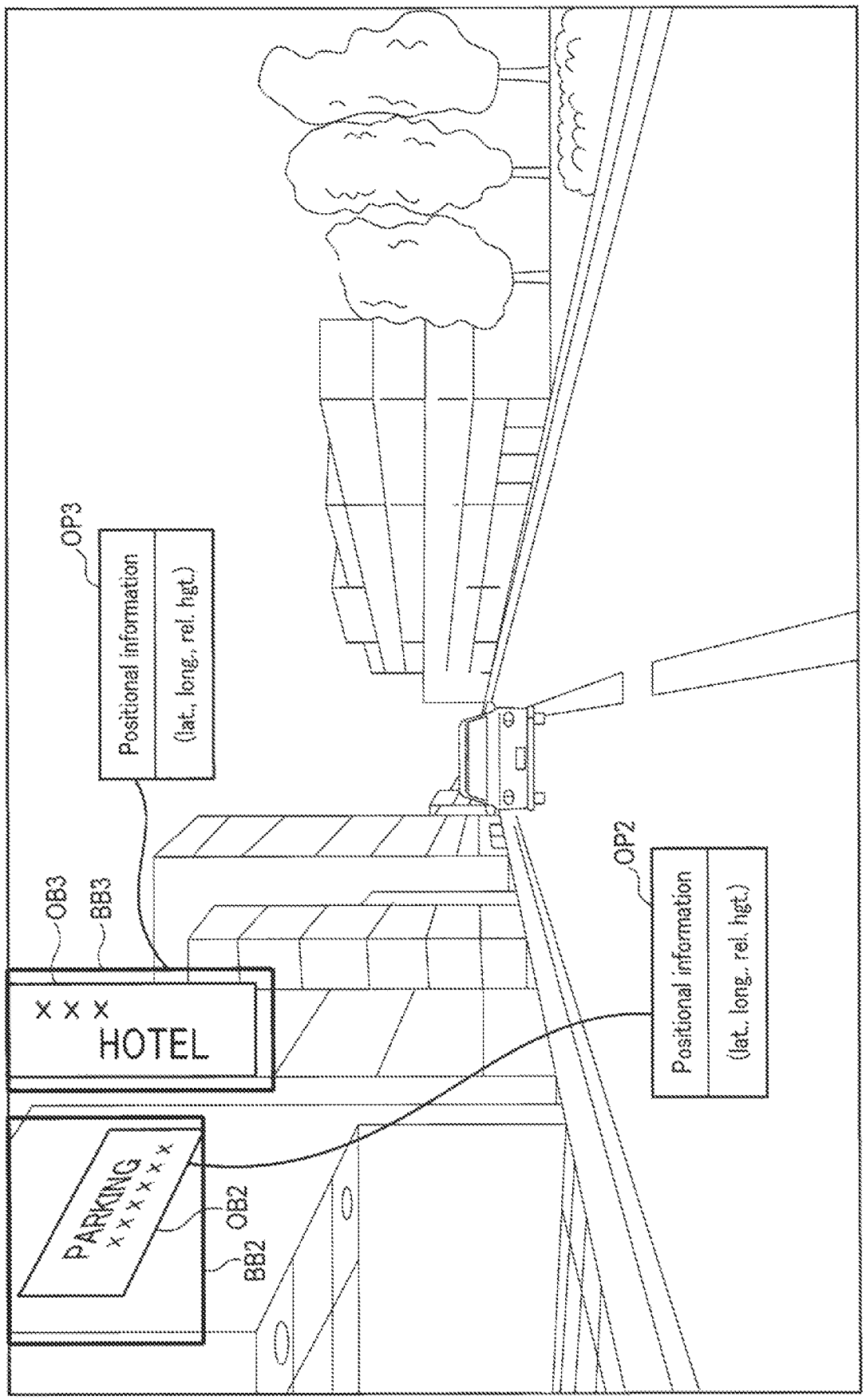
FIG. 17 is a diagram showing an image of positional information of objects read out in the processing of FIG. 16.

FIG. 17 shows an exemplary image in which the positional information of two objects is extracted from the coordinate data memory 34 and displayed in association with the image data. In FIG. 17, a horizontally oriented sign OB2 that reads "PARKING", a vertically oriented sign OB3 that reads "HOTEL", bounding boxes BB2 and BB3 that indicate the detection of the respective signs, and their positional information OP2 and OP3 are illustrated. The positional information is simply indicated as (lat., long., rel. hgt.), but is extracted in actuality as numerical values.

(2-4) Formation of Observation Pair

At step S40, the control unit 20 of the position coordinates estimation device 1 performs an observation pair formation process under the control of the observation pair formation unit 240. Here, the position coordinates OP2 and OP3 of the objects OB2 and OB3 extracted by the coordinates referencing unit 270 are the observation data items, and an observation data pair is formed based thereon. If the position coordinates of more objects are acquired, pairs may be formed from all the possible combinations of records of the observation data.

(2-5) Estimation of Position Coordinates

At step S50, the control unit 20 of the position coordinates estimation device 1 can calculate the position coordinates of the mobile object 4 (i.e., the location of the camera image captured) using the pairs formed by the observation pair formation unit 240, under the control of the coordinates estimation unit 250 in the same scheme as explained in the first embodiment. In the example of FIG. 17, gaze vectors oriented to the objects OB2 and OB3 on the camera coordinate system having the principal point of the camera as the point of origin are calculated, and then the gaze vectors are respectively converted to the ground coordinates. Thereafter, the position coordinates of the mobile object 4 can be obtained by calculating the intersection point of the lines that extend from the gaze vectors to the objects.

Sets of position coordinates of the mobile object 4 are obtained in correspondence to the number of combinations of observation pairs in the same manner as in the first embodiment, and the most likely coordinates can be obtained from the distribution of the coordinate data. The average value or median value of the coordinate data items may be adopted and determined to be definitive coordinates. Other values may be adopted as definitive coordinates from the coordinate data items.

Thereafter, the control unit 20 of the position coordinates estimation device 100 receives the determined definitive position coordinates from the coordinates estimation unit 250, and outputs the coordinates to an external device or the like by way of the input/output interface unit 10, under the control of the output control unit 26.

Effects of Second Embodiment

As described above, the position coordinates estimation device 100 according to the second embodiment acquires camera image data based on the video image that is output from the camera 2 mounted on the vehicle 4, calculates the intersection point of the gaze vectors oriented from the camera to the objects contained in the camera image, for which the position coordinates are obtainable, and thereby estimates the position coordinates of the camera 2 that has captured the image, or in other words, the position coordinates of the mobile object 4.

In particular, when the intersection point of the gaze vectors is calculated, pairs are formed from the position coordinates of the objects that are observation data items; the candidate position coordinates of the mobile object 4 are calculated from each pair; the most likely position coordinates are determined to be definitive position coordinates from the distribution. Thus, the position coordinates of the mobile object 4 can be accurately estimated.

As a result, even in an environment in which GPS information is difficult to receive, such as in a tunnel, the position coordinates of the mobile object 4 can be accurately estimated by using the position coordinates of the surrounding objects in an image captured by a commonly used vehicle-mounted camera 2, without requiring costly sensors.

Other Embodiments

The present invention is not limited to the above embodiments.

In the above description, the position coordinates estimation devices 1 and 100 are mounted on the vehicle 4 as part of the vehicle-mounted system, but this is not a limitation. The devices may be implemented as servers configured to acquire information from the vehicle 4 through a wireless communication network. In particular, the position coordinates estimation device 1 may be implemented as a server, which can receive and accumulate the captured camera images and GPS information from a number of mobile objects so as to integrally calculate and estimate the position coordinates of objects located along the streets. As a result, the position coordinates of a large number of stationary objects can be acquired with an increased accuracy, and map information of a high information density that is continuously updated based on the latest information can be prepared.

Alternatively, the units 21 to 26 of the position coordinates estimation devices 1 and 100 may be distributed to the vehicle-mounted device, cloud computer, edge router and the like in a manner such that these devices can function through cooperation with each other for estimation of position coordinates.

The estimation of the position coordinates of surrounding objects and the estimation of the position coordinates of the mobile object are explained separately in the first embodiment and the second embodiment. These estimations, however, may be performed by a single position coordinates estimation device in an integrated manner. If the position coordinates estimation device is part of the vehicle-mounted system, the estimation of the position coordinates of surrounding objects and the estimation of the position coordinates of the mobile object may be switchable through a manipulation of the driver or automatically in accordance with the surrounding environments during the driving. If the position coordinates estimation device is a server that acquires and uses data from other vehicles, the switching may be performed in accordance with its purpose through the operator's manipulation, or automatically in accordance with the reception state of GPS information at individual vehicles.

In the first embodiment, at least a latitude and longitude are obtained as the positional information of the vehicle 4, and in the second embodiment, the latitudes and longitudes are obtained as the positional information of two objects. These are not limitations, however, and any coordinate data based on any coordinate system can be employed. If this is the case, the position coordinates of the objects or mobile object are estimated as coordinates on the same coordinate system.

The method has been described for estimating the position coordinates of a stationary object or a mobile object with which a pair of observation data items are formed and the intersection point of the gaze vectors is estimated for each pair. The method for estimating the position coordinates, however, is not limited thereto. With respect to the first embodiment, images of a single stationary object may be captured at multiple geographical locations, and the coordinates of the intersection point of the gaze vectors to the stationary object in each of the acquired camera images may be calculated from the position coordinates of imaging locations and the gaze vectors in order to estimate the position coordinates of the stationary object. The lines that extend from the gaze vectors may not cross at a single point, and multiple intersection points may be produced depending on the accuracy of the position coordinates of the imaging locations. From the distribution of these intersection points, the most likely intersection point can be estimated through geometrical or statistical analysis. For instance, the center of a circle that contains all the acquired intersection points may be estimated as the position of the stationary object. With a certain number or more of gaze vectors acquired, even if the GPS information of the imaging location includes an error, the adverse effect of such an error may be suppressed to the allowable level without adding a special sensor.

The method for acquiring the camera image data and GPS measurement data, the formats of data stored in the memories, and the like can be modified within the gist of the invention.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some of the components shown in the embodiments may be omitted. Furthermore, the components of different embodiments may be suitably combined.

REFERENCE SIGNS LIST

1 Position coordinates estimation device
2 Camera
3 GPS sensor
4 Mobile object, vehicle
10 Input/output interface unit
20 Control unit
20A Processor
20B Program memory
21 Observation data acquisition unit
22 Object detection unit
23 Object matching unit
24 Observation pair formation unit
25 Coordinates estimation unit
26 Output control unit
30 Data memory
31 Observation data memory
32 Object data memory
33 Object-specific data memory
34 Coordinate data memory
100 Position coordinates estimation device
230 Object matching unit
240 Observation pair formation unit
250 Coordinates estimation unit
270 Coordinates referencing unit

The invention claimed is:

1. A position coordinates estimation device comprising:
a camera image acquisition unit configured to acquire a plurality of camera images that are captured at different geographical locations and contain at least one identical stationary object;
an image pair formation unit configured to selectively combine two of the camera images and form an image pair;
a position coordinates acquisition unit configured to acquire position coordinates of the geographical locations at which the corresponding camera images in the image pair are captured; and
a position coordinates estimation unit configured to estimate the position coordinates of the stationary object based on the position coordinates of the geographical locations and gaze vectors, which are obtained by converting, to a map coordinate system, gaze vectors oriented from a camera to the stationary object on a camera coordinate system associated with the camera images, in each of the camera images of the image pair,
wherein the gaze vectors are calculated from the camera coordinate system the origin point of which is the center of a camera image, and the gaze vector of the camera coordinate system is converted to the map coordinate system,
wherein the conversion of the coordinates is achieved through rotation of the gaze vector using the equation:

$$\begin{pmatrix} x'_t \\ y'_t \\ z'_t \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\varphi & 0 & \sin\varphi \\ 0 & 1 & 0 \\ -\sin\varphi & 0 & \cos\varphi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} u_t \\ v_t \\ f \end{pmatrix}$$

where $(x_t', y_t', z_t')$ represents a vector in units of m oriented from the position of the principal point of the camera at time t to the position of the object, and $\omega$, $\varphi$, and $\kappa$ represent respective angles of the three axes of the camera coordinates with respect to the positive direction of the ground coordinates.

2. The position coordinates estimation device according to claim 1, wherein the position coordinates estimation unit estimates the position coordinates of the stationary object, based on the position coordinates of the geographical locations and the gaze vectors oriented from the camera to the stationary object, in each of the camera images of the image pair.

3. The position coordinates estimation device according to claim 2, wherein
the position coordinates acquisition unit acquires the position coordinates of the geographical locations, based on information received from a GPS satellite, and
the image pair formation unit acquires information indicating a level of accuracy of the acquired position coordinates of the geographical locations, based on the information received from the GPS satellite, and forms the image pair by selectively combining camera images that correspond to geographical locations the position coordinates of which demonstrate levels of accuracy that exceed a predetermined threshold value.

4. The position coordinates estimation device according to claim 2, wherein
the image pair formation unit forms a plurality of image pairs, and
the position coordinates estimation unit calculates candidate values for the position coordinates of the stationary object from each of the image pairs, and estimates the position coordinates of the stationary object based on the calculated candidate values.

5. A position coordinates estimation method implemented by a position coordinates estimation device, the method comprising:
  acquiring a plurality of camera images that are captured at different geographical locations and contain at least one identical stationary object;
  selectively combining two of the camera images and forming an image pair;
  acquiring position coordinates of the geographical locations at which the corresponding camera images in the image pair are captured; and
  estimating the position coordinates of the stationary object based on the position coordinates of the geographical locations and gaze vectors, which are obtained by converting, to a map coordinate system, gaze vectors oriented from a camera to the stationary object on a coordinate system associated with the camera images, in each of the camera images of the image pair,
  wherein the gaze vectors are calculated from the camera coordinate system the origin point of which is the center of a camera image, and the gaze vector of the camera coordinate system is converted to the map coordinate system,
  wherein the conversion of the coordinates is achieved through rotation of the gaze vector using the equation:

$$\begin{pmatrix} x'_t \\ y'_t \\ z'_t \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\varphi & 0 & \sin\varphi \\ 0 & 1 & 0 \\ -\sin\varphi & 0 & \cos\varphi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} u_t \\ v_t \\ f \end{pmatrix}$$

where $(x'_t, y'_t, z'_t)$ represents a vector in units of m oriented from the position of the principal point of the camera at time t to the position of the object, and $\omega$, $\varphi$, and $\kappa$ represent respective angles of the three axes of the camera coordinates with respect to the positive direction of the ground coordinates.

6. A non-transitory computer readable medium storing a computer program which is executed by a computer to provide the steps of:
  acquiring a plurality of camera images that are captured at different geographical locations and contain at least one identical stationary object;
  selectively combining two of the camera images and forming an image pair;
  acquiring position coordinates of the geographical locations at which the corresponding camera images in the image pair are captured; and
  estimating the position coordinates of the stationary object based on the position coordinates of the geographical locations and gaze vectors, which are obtained by converting, to a map coordinate system, gaze vectors oriented from a camera to the stationary object on a coordinate system associated with the camera images, in each of the camera images of the image pair,
  wherein the gaze vectors are calculated from the camera coordinate system the origin point of which is the center of a camera image, and the gaze vector of the camera coordinate system is converted to the map coordinate system,
  wherein the conversion of the coordinates is achieved through rotation of the gaze vector using the equation:

$$\begin{pmatrix} x'_t \\ y'_t \\ z'_t \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\varphi & 0 & \sin\varphi \\ 0 & 1 & 0 \\ -\sin\varphi & 0 & \cos\varphi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} u_t \\ v_t \\ f \end{pmatrix}$$

where $(x'_t, y'_t, z'_t)$ represents a vector in units of m oriented from the position of the principal point of the camera at time t to the position of the object, and $\omega$, $\varphi$, and $\kappa$ represent respective angles of the three axes of the camera coordinates with respect to the positive direction of the ground coordinates.

* * * * *